United States Patent [19]

Feuer

[11] 4,335,451
[45] Jun. 15, 1982

[54] SIGNALLING METHOD AND APPARATUS FOR ENHANCING ECHO IMAGES

[75] Inventor: Mervyn L. Feuer, Grass Valley, Calif.

[73] Assignee: Leonard Frazier, Suisun, Calif.

[21] Appl. No.: 133,525

[22] Filed: Mar. 24, 1980

Related U.S. Application Data

[63] Continuation of Ser. No. 942,965, Sep. 18, 1978, abandoned.

[51] Int. Cl.³ .............................................. G01S 15/06
[52] U.S. Cl. ................................. 367/115; 343/5 DP
[58] Field of Search ........................ 367/87, 113, 115; 343/5 DP, 5 PC, 5 SC

[56] References Cited

U.S. PATENT DOCUMENTS

| | | | |
|---|---|---|---|
| 2,472,209 | 6/1949 | Hall | 315/378 |
| 3,246,285 | 4/1966 | Kryter | 367/107 |
| 3,363,226 | 1/1968 | Murphree | 367/115 |
| 3,719,920 | 3/1973 | Grada et al. | 367/115 |
| 3,761,873 | 9/1973 | Hopkin | 367/115 |
| 4,050,057 | 9/1977 | Backman, Jr. et al. | 367/115 |
| 4,104,609 | 8/1978 | Minegishi et al. | 367/110 |
| 4,107,678 | 8/1978 | Gross et al. | 343/5 DP |

Primary Examiner—Richard A. Farley
Attorney, Agent, or Firm—A. C. Smith

[57] ABSTRACT

A marine depth sounder uses digital techniques to enhance the image of a received acoustic pulse for providing expansion of a portion of the range information with high resolution.

15 Claims, 10 Drawing Figures

$T_0$ — START SWITCH CLOSURE, PEN AT BEGINNING OF STRIP CHART.

$T_1$ — ECHOS PREVIOUSLY RECORDED IN DIGITAL MEMORY ARE RECORDED ON THE STRIP CHART FROM $T_0$ TO $T_1$. TRANSDUCER FIRES AT $T_1$ ECHO'S MAY BE READ STARTING AT $T_1$ (SURFACE) OR A SHIFT ($T_1$-$T_2$) UP TO 999 FATHOMS CAN BE INTRODUCED TO ADJUST THE THE STARTING DEPTH ON THE CHART $T_2$ — RECORDING RANGE IS ADJUSTED BY CLOCKING THE MEMORY AT DIFFERENT FREQUENCIES FROM $T_2$ TO $T_3$.

Figure 3

SIGNALLING METHOD AND APPARATUS FOR ENHANCING ECHO IMAGES

CROSS REFERENCE

This is a continuation of application Ser. No. 942,965, filed Sept. 18, 1978, and now abandoned.

BACKGROUND OF THE INVENTION

Certain known depth-sounding instruments emit high-energy acoustic pulses directed toward the ocean bottom and then amplify received echoes to provide range or depth information. Various signal processing is known to be useful for shifting the range information that is displayed to include a distance or depth offset, and also for selecting the level of received echo which is amplified to provide distance or depth indications.

SUMMARY OF THE INVENTION

In accordance with the present invention, signal processing of received echo signals in a marine depth sounder enables an effectively "zoomed" image of a small region of the depth-sounding range to be displayed with high resolution about a selectable range value. This is accomplished in accordance with one embodiment of the present invention by storing digitized echo information in discrete, addressed memory locations for subsequent recall on an expanded time scale relative to the time scale upon which the digitized information was stored in sucessive, addressed memory locations. This enables a small portion of the depth-sounding range to be displayed in expanded form without affecting the displayed range. Also, for any given range, the size of an echo can be expanded without changing scale.

DESCRIPTION OF THE PREFERRED EMBODIMENT

Figure 1:
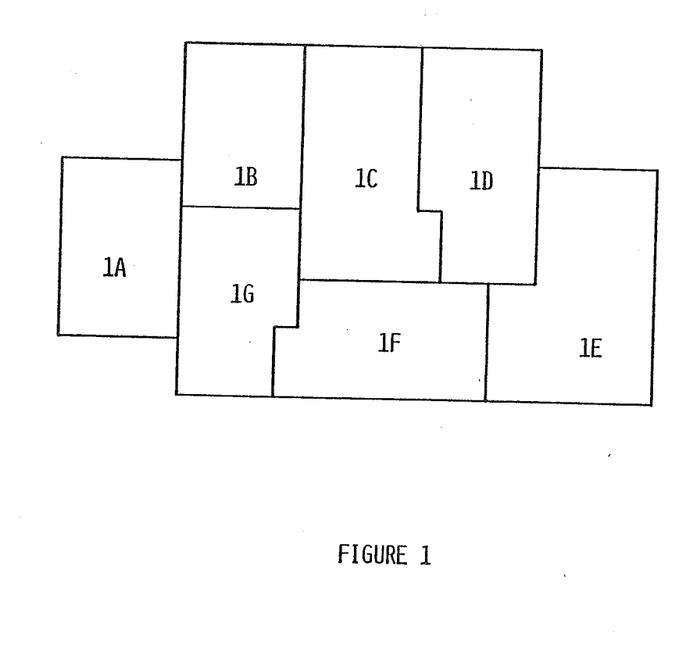
FIG. 1 is a graphic diagram of the composite schematic drawing comprising FIGS. 1A through 1G which illustrates one embodiment of the echo-signalling apparatus of the present invention.
Figure 1A:
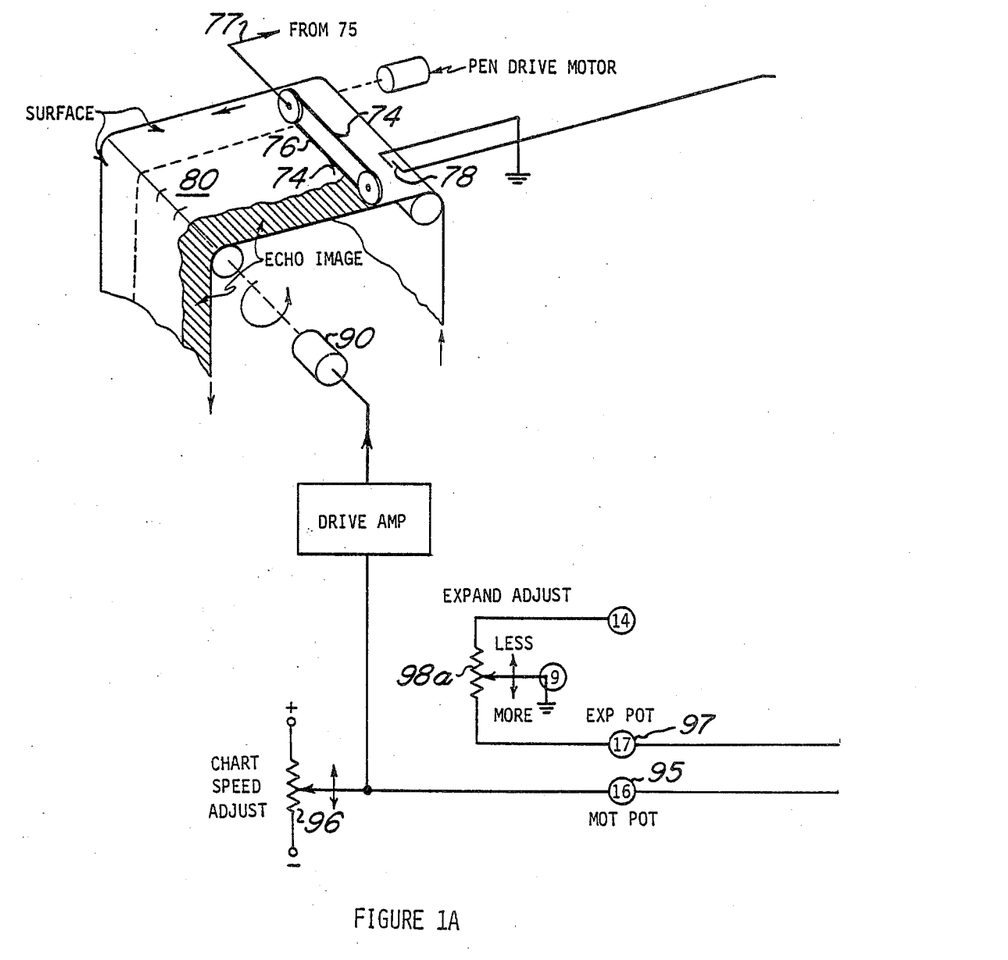
FIGS. 1A through 1G comprise a schematic diagram of the preferred embodiment of the echo-signalling apparatus of the present invention.
Figure 1B:
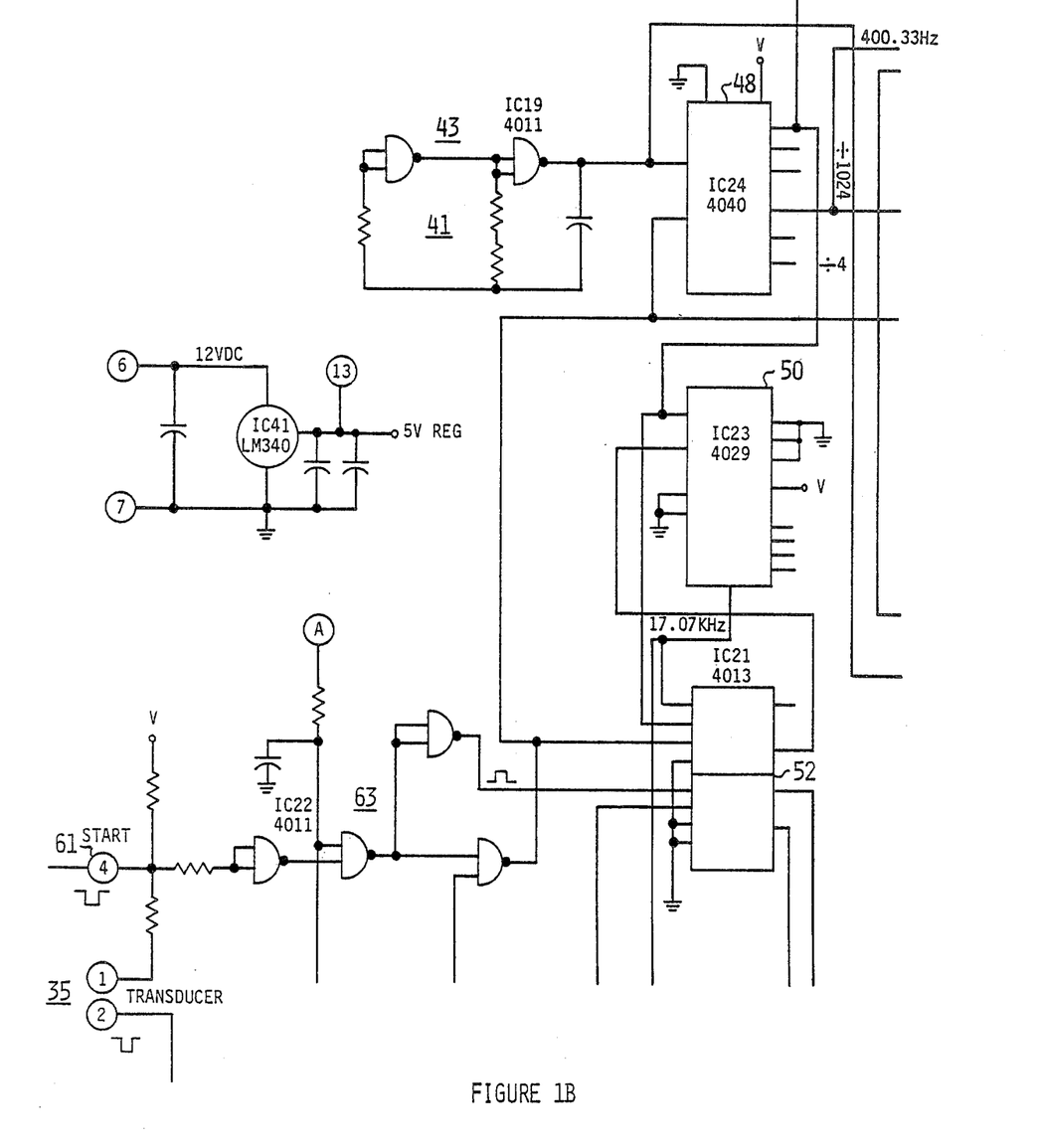
Figure 1C:
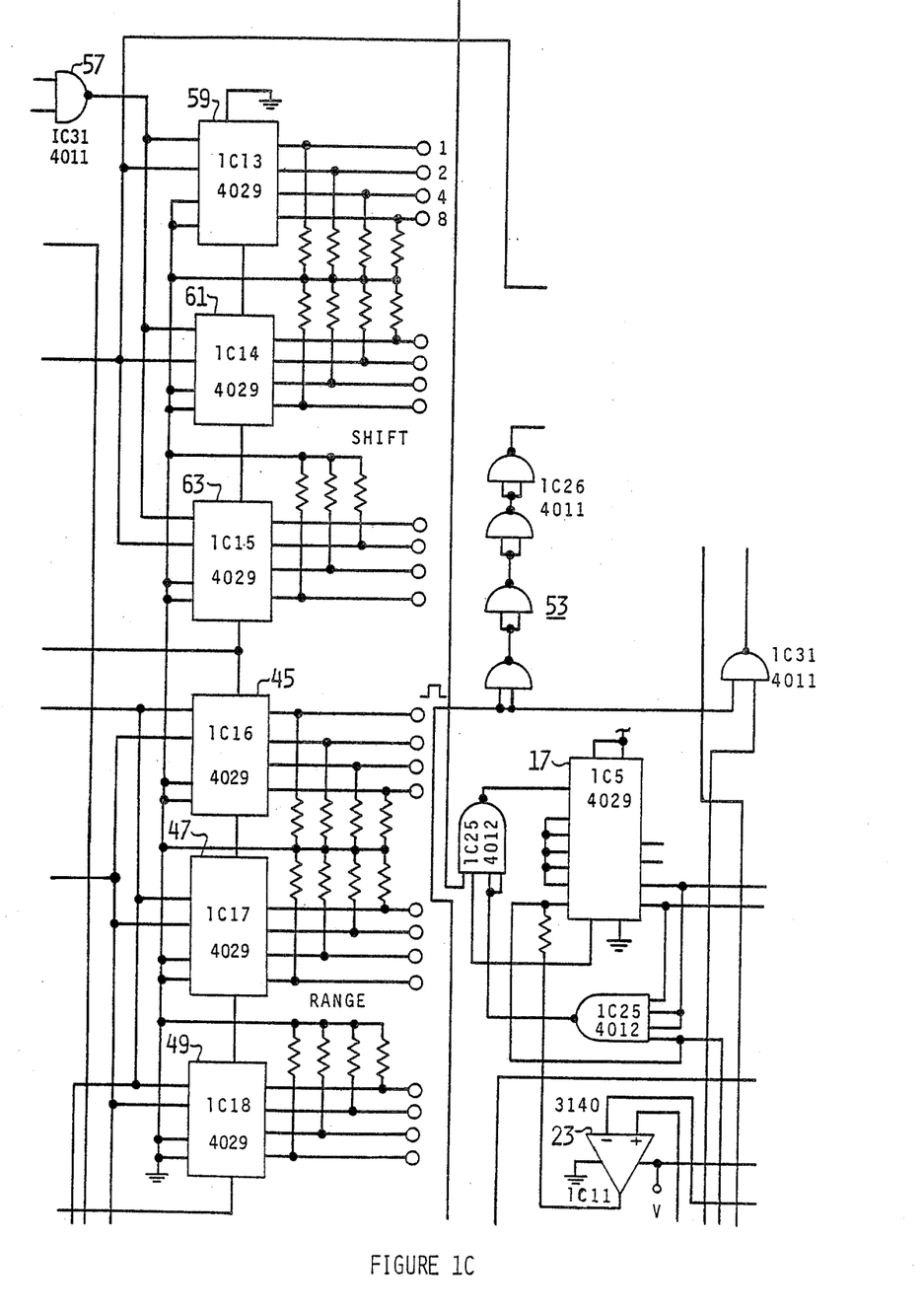
Figure 1D:
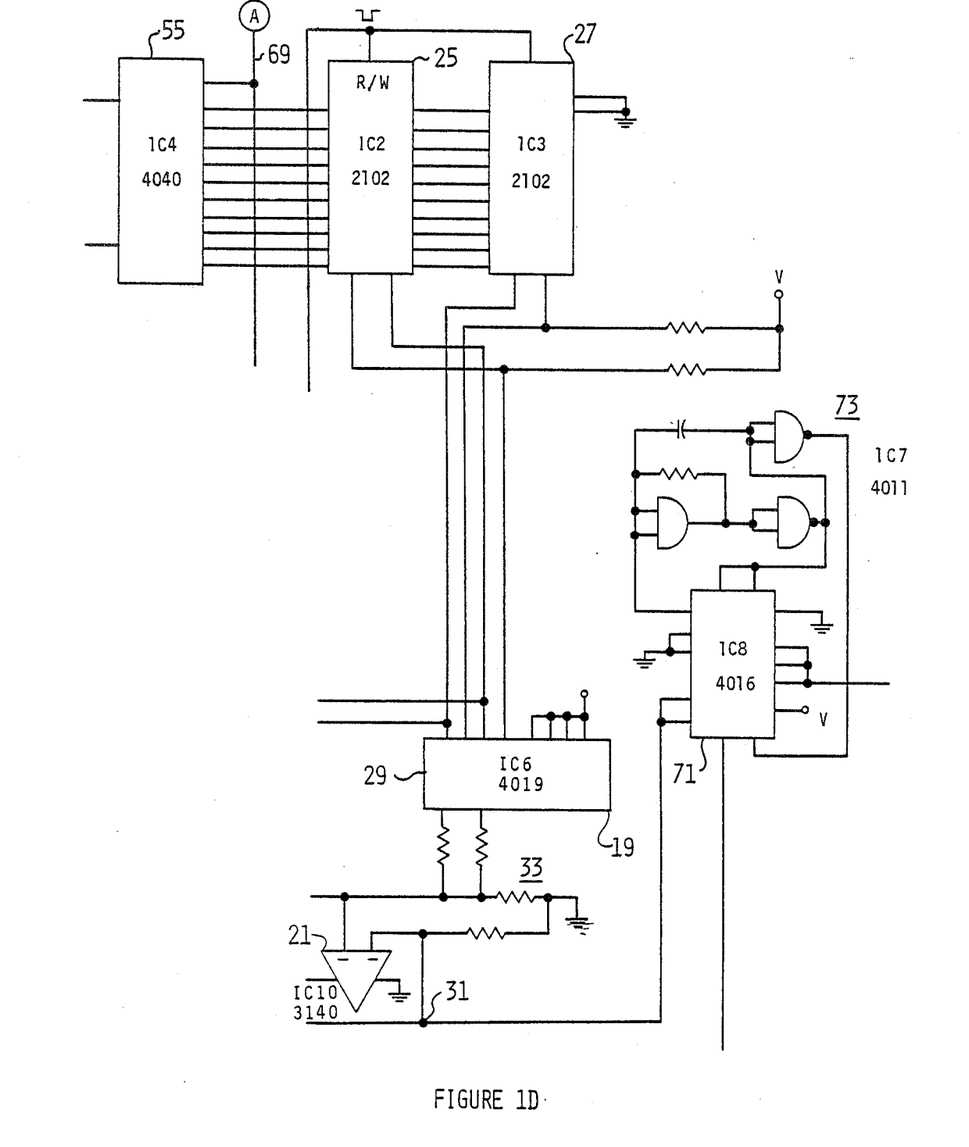
Figure 1E:
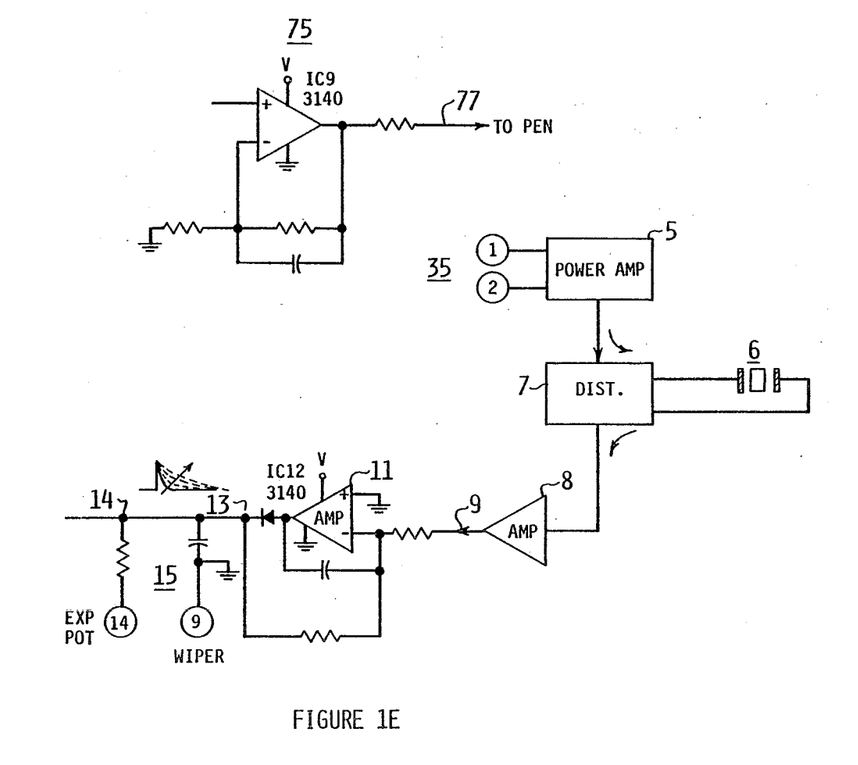
Figure 1F:
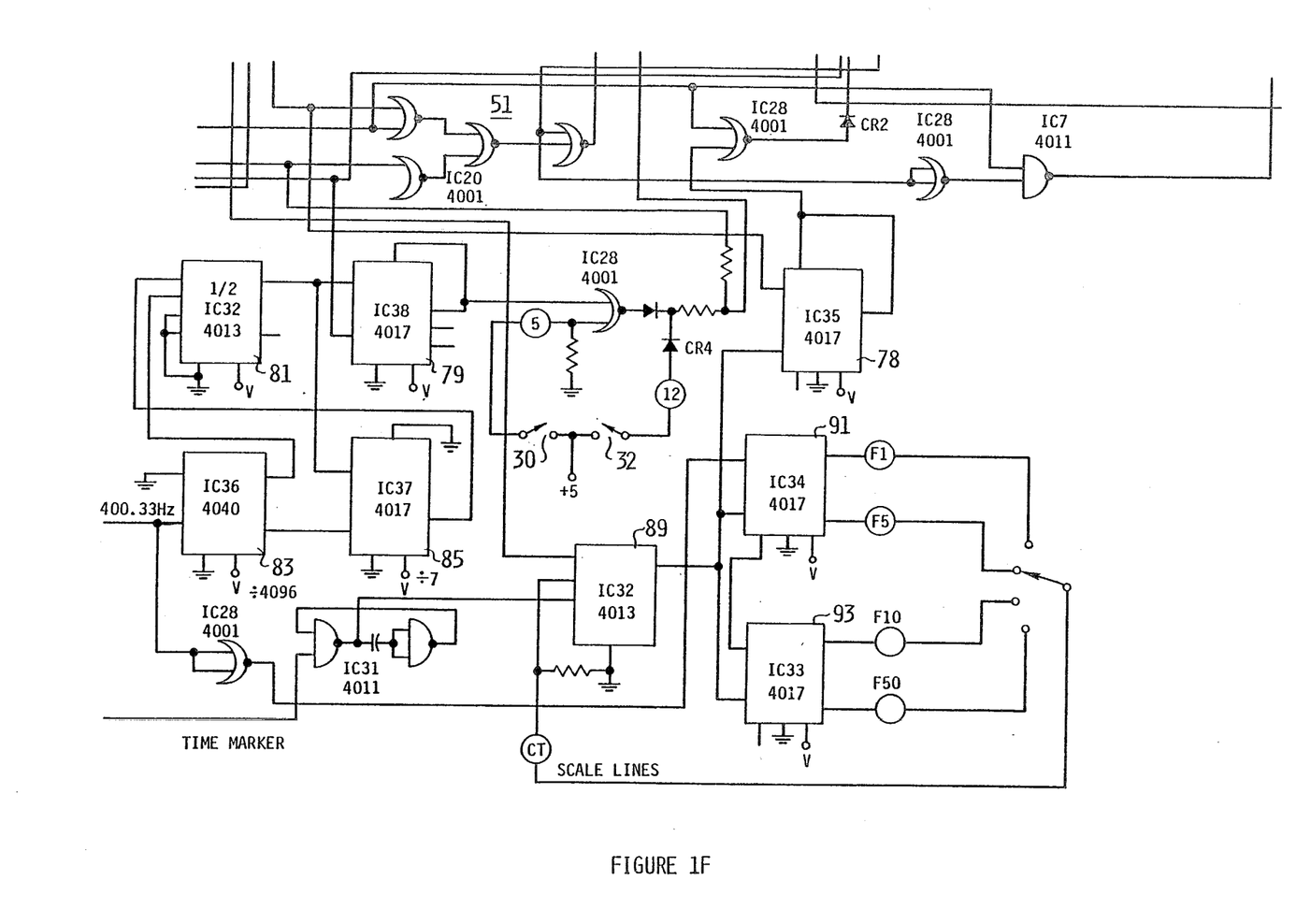
Figure 1G:
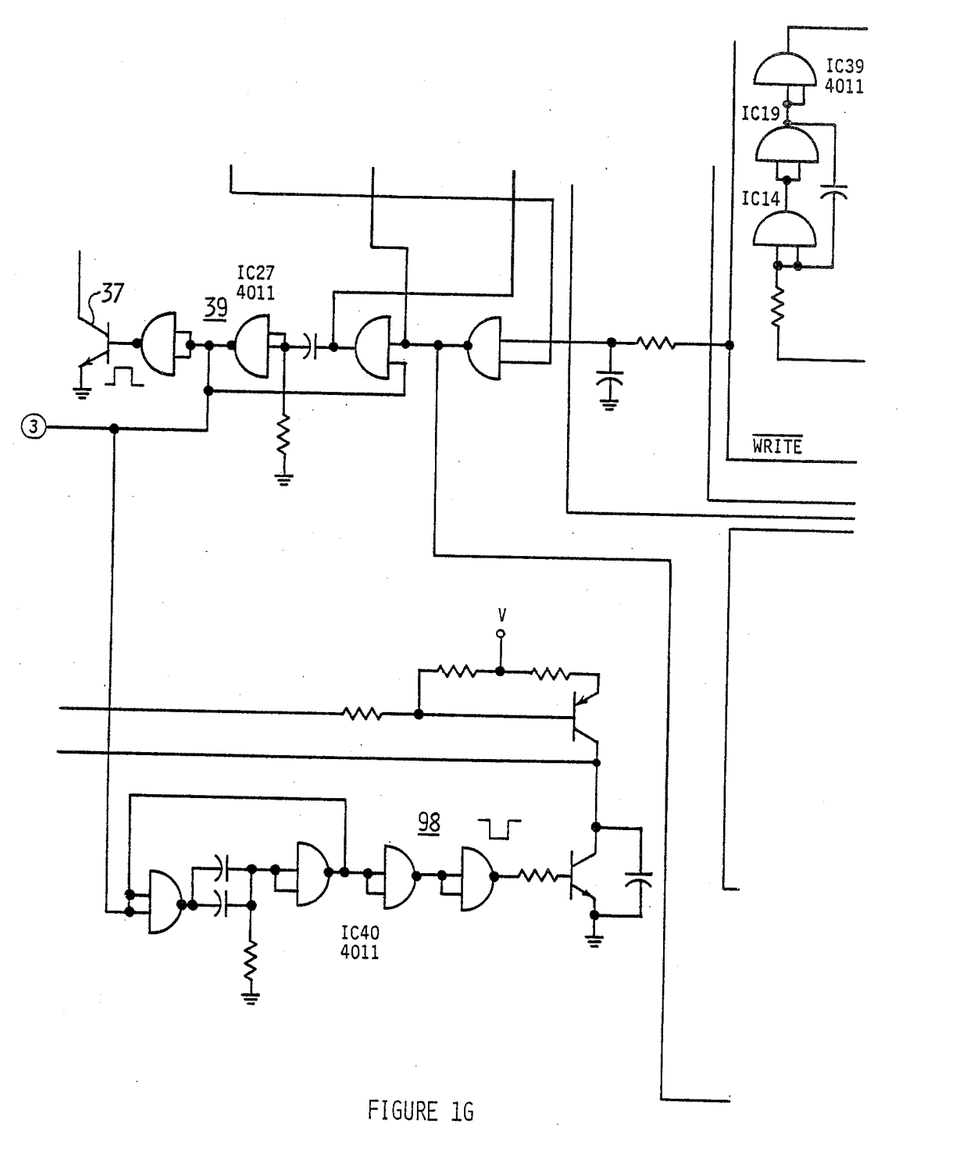

Referring now to FIG. 1, there is shown an input 9 which receives an analog signal from echo amplifier 8 that receives echo signal from transducer 6 via a conventional input-output circulator or distributor 7. The signal at input 9 is thus proportional to the intensity of a received echo signal. This analog signal is amplified and rectified 11, 13 to provide an output 14 proportional to the echo envelope which is then applied to an adjustable storage circuit 15 that controls expansion of the displayed image, as later described.

The output 14 is quantized or digitized within, say, four discrete levels by an analog-to-digital converter comprising conventional integrated circuit modules 17, 19, 21 and 23, and the associated gate circuits. In operation, these circuit modules apply the output 14 to the comparator comprising circuit module 23 for comparison with the digital signal generated by circuit modules 29 and associated resistors. This comparison of an analog signal with a digitally-generated signal causes the accumulator 17 to count up or down, depending upon the magnitude of the analog signal 14 relative to the digital signal 31. The count controls the switch connections in the resistor network 33 which, in turn, produces the digital signal for comparison with the analog signal 14.

The digital signal levels produced in this manner, or by other suitable digitizing techniques, can then be recorded in sequential addresses within integrated circuit modules 25 and 27 which may be two bits by 1024 addresses. These stored echo-level signals are thus available for subsequent, successive addressing at a selected addressing rate to control the depth scale of the displayed image.

The acoustic pulse for depth sounding is generated in response to a high-voltage pulse from amplifier 37 applied to power amplifier 5 in response to the output from monostable multi-vibrator 39. The resulting amplified pulse is applied to transducer 6 via the distributor circuit 7 which then generates a sonic wavefront that can propagate through water toward a distant object. The sonic wavefront or pulse may be produced in this manner, for example, in response to a lapse-time indicating device such as a rotating wheel or recording stylii 74 on a rotating belt 76 actuating a switch 78 that is selectively positioned along the path of the belt 76 relative to a reference point (say, zero) on a recording chart 80 (for example, electrosensitive paper).

The timing of operations is controlled by the circuit 43 and the resistor, capacitor network 41 connected therewith which supplies the operating frequency to the RANGE frequency dividers 45, 47 and 49. These dividers may be set to divide the applied frequency by a factor determined by the digital codes applied thereto via switches (not shown) which are set to establish the selected range (of depth or distance). The selectively-divided frequency is applied via gate circuit 51 and a time-delay circuit 53 to the address counter 55 for the digital memory 25 and 27.

The clock frequency generated by circuit 41, 43 is also divided by 1024 in divider 48 and is applied via gate 57 to the SHIFT delay counters 59, 61 and 63. These counters introduce a delay or shift proportional to the preset values established by digital codes applied thereto via switches (not shown) which are set to establish a desired shift in displayed range. Thus, a given SHIFT setting disables the range counters and this delays the memory read clock for the selected time interval following a start event.

The start event occurs when a stylus 74 on the belt 76 of the indicating device is at a reference (say, zero) location. A start pulse produced by switch 78 actuated by a companion stylus 74 is received at input 61 and is gated through circuit 63 to reset the memory address counter 55, and the dividers 48, 50, and to set the read-write flip-flop 52 to the write state. This gates the write clock from circuit 50 through gates 51 to the memory address counter 55. The write frequency is selected such that the address counter cycles through all 1024 address locations in the period of one display cycle of a stylus 74 moving from the start to the end of a single sweep line associated with the display movements of the indicating device. At the end of each such sweep line, the output 69 from address counter 55 is connected to reset the read-write flip-flop 52 to the read state, and also to activate the transducer 6 which is connected via power amplifier 5 connected to output 35 via amplifier 37, 39.

With respect to the digital data that is stored as digitally-encoded level information in the memories 25 and 27, this information when read out is converted to one of four D.C. signal levels by digital-to-analog converter circuit comprising modules 21 and 29. The resulting D.C. signal at 31 is applied to circuits 71, 73 and 75 which produce a proportional A.C. signal for application to the stylii 74 of the display device that uses electrosensitive chart paper 80.

Time markers on the chart paper 80 can be produced by dividing down the clock frequency to, say, one pulse per minute, and the marker width may be conveniently selected as an integral number of the clock pulses, as determined by the circuit modules 78, 79, 81, 83 and 85. Time marks may be inhibited by closing switch 30. Also, scale marks may be produced, for example, at 1, 5, 10 and 50 fathoms on such a strip chart by providing a signal to circuit module 89 which appears at the requisite times during echo propagation, and which is produced by dividing down the clock frequency in dividers 91 and 93. Scale marks can be produced in response to operator closing switch 32.

The chart-drive motor 90 for the indicating device or recorder is controlled in response to the setting of the chart-speed potentiometer 96 that is connected to the output 95, and is modulated (or slowed down) in response to the (increased) depth from which echo signals are received. At the time, the setting of an EXPAND potentiometer 98a connected between terminals 14 and 16 serves to alter chart motor speed 90 so that an echo image can be displayed expanded horizontally as well as vertically. This potentiometer 98a is connected (via terminal 14) as part of the RC timing circuit 14, 15 to which the amplified echo signal from amplifiers 8 and 11 is applied. The decay of the signal across this network 14, 15 is determined by the setting of the EXPAND potentiometer 98a and, since the stylus speed 74 across the chart 80 is essentially constant, the duration of the amplified echo signal being applied to the moving stylus 74 is increased as the potentiometer 98a is set toward terminal 97, thereby increasing or expanding the echo image on the chart 80. Also, this circuit arrangement allows the time scale on which the occurrences of received echoes are recorded to be spread out while the data in memory 25 and 27 is being successively addressed and read out, as previously described. The data thus appears as "zoomed" or expanded by an amount controlled by the setting of a potentiometer connected to terminal 97. In addition, the chart-drive motor speed is decreased as a function of the depth, under the control of circuit 98 in response to the occurrence of a transmit pulse applied to the transducer 6 connected through output 35. The circuit 98 supplies current to the drive amplifier and drive motor 90 for a fixed period of time each time the transmit pulse appears.

Figure 2:
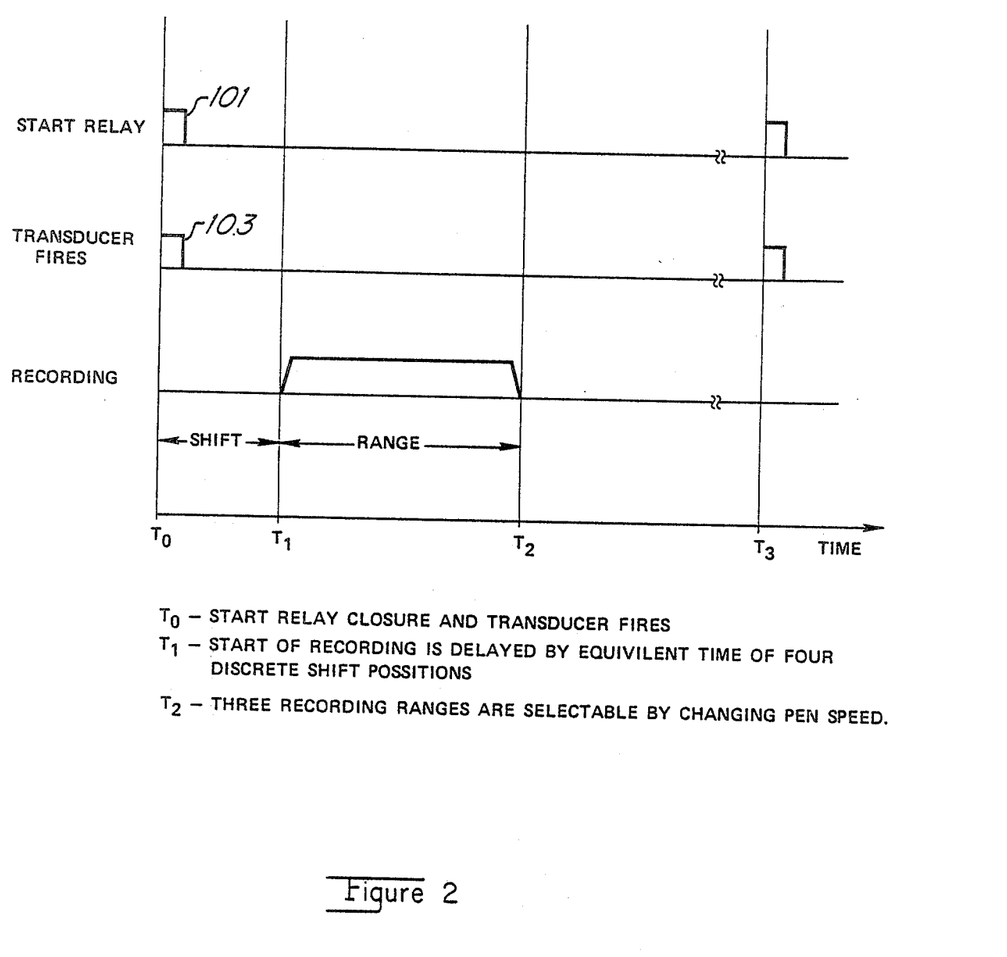
FIG. 2 is a graph showing signals present during operation of the apparatus of FIG. 1 without the zoom characteristic.

Referring now to FIG. 2, there is shown a time-oriented sequence of signals which appear in the circuit of FIG. 1 during the operation thereof. A start pulse 101 may be produced, for example, by the stylus 74 or other visual indicator on a cyclic or rotating carrier (belt 76) being positioned at a reference location. This pulse appearing at input 61 of FIG. 1 initiates a transmit pulse 103 applied to the transducer 6 connected through output 35. This also initiates a count accumulation or division in the SHIFT counters 59, 61 and 63 which terminates at $t_1$ after the selected shift count, as determined by the settings of SHIFT switches connected thereto, is accumulated. Returning echoes received by transducer 6 may occur within the period $t_1$ to $t_2$, as a function of the depth or distance away from the transducer to the reflecting object. The spacing between $t_1$ and $t_2$ on the visual display is determined by the speed at which the chart-drive motor 80 (or other carrier of a cyclic visual indicator) operates, as previously described.

Figure 3:
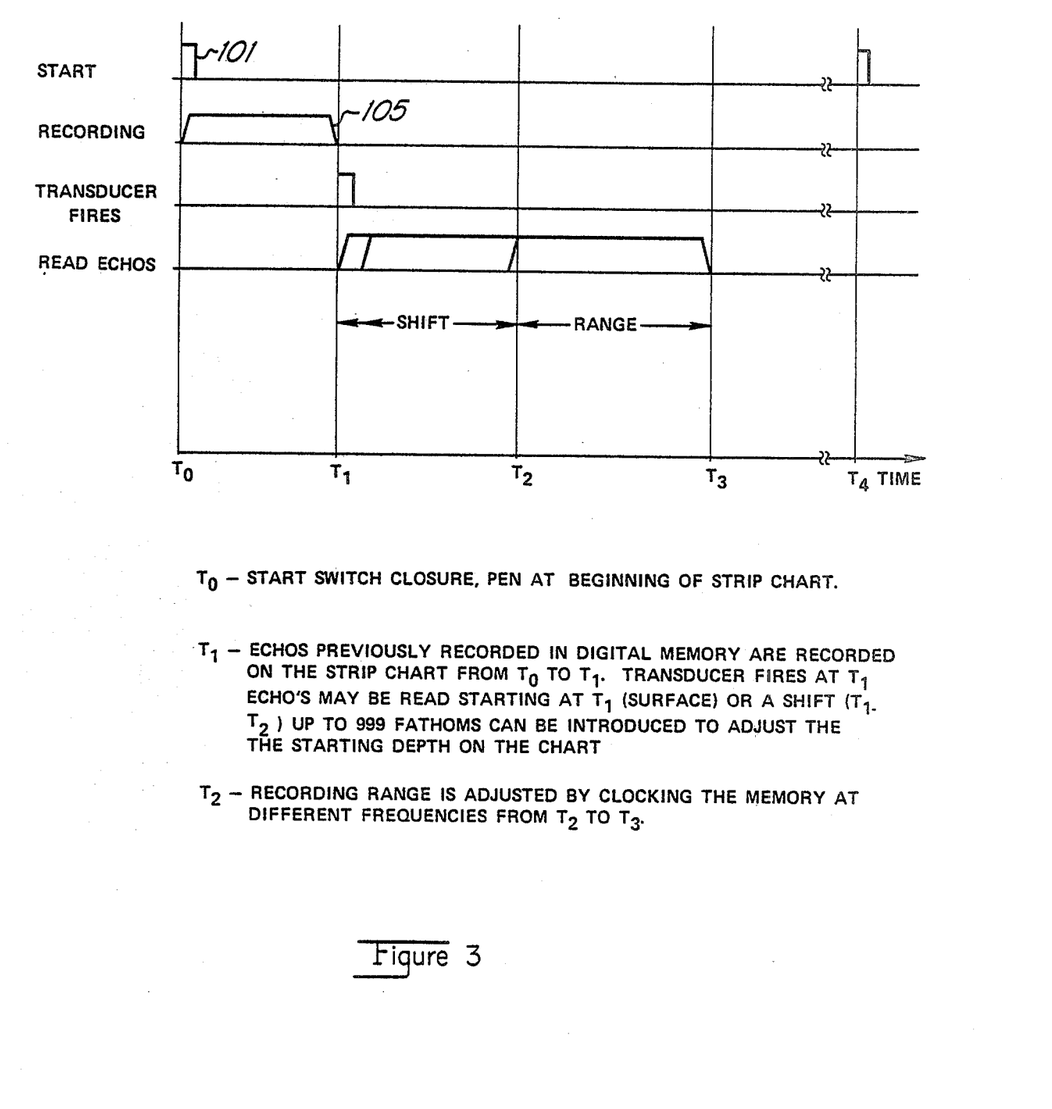
FIG. 3 is a graph showing signals present during operation of the apparatus of FIG. 1 with the zoom characteristics.

In accordance with another operating embodiment of the present invention, as illustrated in FIG. 3, the start event 101 triggers the memory address counter to successively address 1024 two-bit codes stored in memory during a previous operating cycle to provide visual indication of the digitized echo levels on the chart 80 between $t_0$ and $t_1$. At the end of the display cycle ($t_1$), the transducer is activated to transmit a pulse 105 toward a reflective object. Immediately thereafter, or after a preset shift interval ($t_1-t_2$), the echo returning from the reflective object may be digitized and stored in successive memory address during the period $t_2$ to $t_3$. The recording range is thus adjusted by clocking the memory at different selectable frequencies. Then, during the next recording period $t_0-t_1$ following the start pulse, this data thus stored may be read out on the strip chart 80 moving at a selected chart speed to produce a zoomed image of the reflective object without affecting the RANGE setting at which the echo data was collected.

Thus, the present invention provides the method and means for producing a visual display of depth or distance which can zoom in to expand a small portion of a given range of depth readings without affecting the depth indication. In this way, a selected image at a certain depth can be examined with greater resolution. In addition, the present invention allows the echo image to be increased or expanded both horizontally and vertically beyond the size normally attained on a particular display scale. This makes small images easier to see. Also, the present invention allows control of paper speed as a function of the depth from which echo signal is received for improved display of reflective objects.

I claim:

1. The method of enhancing the output indication of a reflective object in an echo-responsive device, the method comprising the steps of:
   initiating a transmit pulse directed toward a reflective object;
   receiving an echo of a transmit pulse which is reflected from a reflective object;
   expanding in time duration the echo received from the reflective object;
   producing a plurality of samples of the expanded echo at successive intervals for storage in successively addressed memory locations; and
   simultaneously initiating a period during which an output indication is produced and initiating the successive addressing of the samples stored in the plurality of memory locations for producing output indications thereof in succession during said period.

2. The method of claim 1 comprising the step of introducing a delay interval following initiation of a transmit pulse and prior to the step of producing and storing a plurality of samples of the expanded echo.

3. The method for enhancing the output indication of a reflective object according to claim 1 wherein the step of producing output indications of samples stored in the plurality of memory locations includes:

displaying a visual marker at a location along one coordinate display axis proportional to time and along another coordinate display axis at a location therealong which is spaced from a reference location by a distance proportional to the appearance in the sequence of locations in memory at which the corresponding sample is stored; and expanding the output indication by increasing the proportionality to time along the one coordinate axis in response to expansion of the duration of said received echo to provide additional samples which are stored in successively addressed memory locations and which are displayed along said other coordinate axis.

4. The method for enhancing the output indication of a reflective object according to claim 1 wherein the step of producing output indications includes:

displaying a visual marker at a location along one coordinate display axis proportional to time and along another coordinate display axis at a location therealong which is spaced from a reference location by a distance proportional to the appearance in the sequence of locations in memory at which the corresponding sample is stored; and selectably enhancing the output indication by decreasing the proportionality to time along the one coordinate axis in accordance with the duration of the interval over which an echo is received for sampling and display along the other coordinate axis.

5. Apparatus for enhancing the output indication of a reflective object in an echo-responsive device, comprising:

transducer means for initiating a signal directed toward a reflective object;

first circuit means coupled with the transducer means for producing an electrical signal that is expanded in time duration from an echo returned from a reflective object following initiation of said signal;

second circuit means coupled to receive the electrical signal for successively sampling the levels thereof with time;

storage means having a plurality of successively addressable memory locations for storing the succession of samples therein;

output means for producing a visual indication of signals applied thereto at an indication location which is a function of the time of occurrence of a signal applied thereto relative to the start of an operating cycle; and means responsive to the start of an operating cycle of the output means for successively addressing the samples in memory for successive applications thereof to the output means during the operating cycle to produce an output indication of a reflective object.

6. Apparatus as in claim 5 comprising delay means connected to initiate the successive sampling of the electrical signal from the first circuit means after a selected delay interval.

7. Apparatus as in claim 5 wherein said output means produces visual display at a location along a first coordinate axis which is proportional to time and at a location along a second coordinate axis which is proportional to the sequence in memory at which the sample is stored; and means coupled to the first circuit means and to the output means for simultaneously expanding the duration of the electrical signal and altering the proportionality to time along the first coordinate axis in order to expand the display of received echoes.

8. Apparatus as in claim 5 wherein said output means produces visual display at a location along a first coordinate axis which is proportional to time and at a location along a second coordinate axis which is proportional to the sequence in memory at which a displayed sample is stored; and means coupled to the output means for decreasing the proportionality to time along the first coordinate axis in relation to the duration of the interval over which an echo is received for sampling and display along the second coordinate axis.

9. In a system for transmitting a signal toward a reflective object and for displaying echoes received back therefrom, the improvement comprising:

means coupled to selectively expand the duration of a signal representative of a received echo;

circuit means coupled to receive the signal of selectively expanded duration for producing a plurality of samples thereof at successive intervals;

means coupled to the circuit means for storing signals at successive memory locations which are representative of the samples; and means producing output signals in response to the signals stored in successive memory locations to produce a display therefrom of a reflective object.

10. In a system according to claim 9 in which the display of echoes is provided by visual displays produced as a function of time along at least one of a pair of coordinate axes, the improvement further comprising:

means responsive to the selective expansion of said signal for altering the function of time along one coordinate axis along which visual displays are produced to expand the display of echoes as said signal is selectively expanded; and means for supplying signals to be displayed along the other coordinate axis that are representative of said signals stored at successive memory locations.

11. In a system according to claim 10 in which the display of echoes is provided by visual displays produced along a pair of coordinate axes, the improvement further comprising:

means selectively timed with the transmission of a signal toward a reflective object and coupled to said circuit means for delaying the sampling of the selectively expanded signal; and means responsive to the duration of the delay for altering the function of time along said one coordinate axis to decrease the rate of display along said one axis as the period of signal propagation toward and back from a reflective object increases.

12. In a system according to claim 9 in which the display is formed on a strip chart moving with time along one axis by marks formed thereon along an axis transverse to said one axis at locations spaced from a reference by distances which are representative of a time delay interval, the improvement further comprising:

means for supplying signal to control the speed of movement of the strip chart along the one axis as a function of said expansion of said signal; and means for supplying signals to mark the strip chart along the transverse axis at locations therealong relative to the reference which are representative of said successive locations in memory at which said samples are stored.

13. In the system according to claim 12 the improvement further comprising:

means for selectively delaying the sampling of said signal to provide samples representative of an echo received from a reflective object only beyond a selected distance; and means responsive to the total interval of said selective delay and the sampling period for decreasing the speed of movement of the strip chart along said one axis as said total interval increases.

14. The method for enhancing the output indication of a reflective object in an echo-responsive device, the method comprising the steps of:

initiating a transmit pulse directed toward a reflective object;

receiving an echo of a transmit pulse which is reflected from a reflective object;

expanding in time duration the echo received from the reflective object;

displaying a visual marker at a location along one coordinate display axis proportional to time and along another coordinate display axis at a location therealong which is spaced from a reference location by a distance proportional to time; and selectably expanding the output indication by increasing the proportionality to time along the one coordinate axis in response to expansion of the received echo, the representation of which is displayed along said other coordinate axis.

15. Apparatus for enhancing the output indication of a reflective object in an echo-responsive device, comprising:

transducer means for initiating a signal directed toward a reflective object;

circuit means coupled with the transducer means for producing an electrical signal that is expanded in time duration from an echo returned from a reflective object following initiation of said signal;

output means for producing a visual display at a location along a first coordinate axis which is proportional to time and at a location along a second coordinate axis which is proportional to time relative to the start of an operating cycle;

means responsive to the start of an operating cycle of the output means for applying visual marking signals that are representative of said electrical signal to the output means during the operating cycle to produce an output indication of a reflective object; and means coupled to the circuit means and to the output means for simultaneously expanding the duration of the electrical signal and altering the proportionality to time along the first coordinate axis in order to expand the display of the reflective object.

* * * * *